United States Patent
Bregier et al.

(10) Patent No.: US 8,806,924 B2
(45) Date of Patent: Aug. 19, 2014

(54) SEALING HEAD FOR AN INSTALLATION FOR FLUID TESTS ON AN AIRCRAFT TURBINE ENGINE PART

(75) Inventors: Ludovic Bregier, Chatellerault (FR); Cathy Cleach, Saint-Georges-les-Baillargeaux (FR); Philippe Moreau, Bonneuil Matour (FR)

(73) Assignee: SNECMA, Paris (FR)

( * ) Notice: Subject to any disclaimer, the term of this patent is extended or adjusted under 35 U.S.C. 154(b) by 251 days.

(21) Appl. No.: 13/265,708

(22) PCT Filed: Apr. 21, 2010

(86) PCT No.: PCT/EP2010/055261
§ 371 (c)(1),
(2), (4) Date: Oct. 21, 2011

(87) PCT Pub. No.: WO2010/122052
PCT Pub. Date: Oct. 28, 2010

(65) Prior Publication Data
US 2012/0031177 A1 Feb. 9, 2012

(30) Foreign Application Priority Data
Apr. 22, 2009 (FR) ...................................... 09 52632

(51) Int. Cl.
*G01M 15/04* (2006.01)

(52) U.S. Cl.
USPC ...................................................... 73/112.01

(58) Field of Classification Search
USPC ............. 73/47, 49.7, 112.01, 112.03, 118.02, 73/118.03
See application file for complete search history.

(56) References Cited

U.S. PATENT DOCUMENTS

| | | | |
|---|---|---|---|
| 4,602,500 A | 7/1986 | Kelly | |
| 6,595,062 B1* | 7/2003 | Luke et al. | ...................... 73/714 |
| 6,976,509 B1 | 12/2005 | Kirvan | |
| 8,438,915 B2* | 5/2013 | McCall et al. | ............. 73/112.01 |
| 2009/0084170 A1 | 4/2009 | Quinn et al. | |
| 2013/0047714 A1* | 2/2013 | McCall et al. | ............. 73/112.01 |

FOREIGN PATENT DOCUMENTS

| | | |
|---|---|---|
| DE | 20 2005 018 914 U1 | 3/2006 |
| GB | 2 095 771 A | 10/1982 |
| GB | 2 303 926 A | 3/1997 |

OTHER PUBLICATIONS

International Search Report issued Jul. 23, 2010, in PCT/EP2010/055261.

* cited by examiner

Primary Examiner — Eric S McCall
(74) Attorney, Agent, or Firm — Oblon, Spivak, McClelland, Maier & Neustadt, L.L.P.

(57) ABSTRACT

A sealing head for an installation configured to perform fluid tests on an aircraft turbine engine part. The sealing head includes a sealing element crossed by a passage for flowing of a gas flow, the sealing element including a sealing surface configured to come into contact with a part to be tested, at an aperture of the part to be tested configured to be fed with the gas flow. The sealing head includes a mechanism centering the sealing element relatively to the aperture of the part, the centering mechanism being firmly attached to the sealing element and protruding towards the front of the surface having an outer portion surrounding the centering mechanism.

10 Claims, 7 Drawing Sheets

SEALING HEAD FOR AN INSTALLATION FOR FLUID TESTS ON AN AIRCRAFT TURBINE ENGINE PART

TECHNICAL FIELD

The present invention generally relates to the field of installations aiming at performing fluidic tests on aircraft turbine engine parts having a circuit intended for the flowing of a gas flow.

More specifically, the invention relates to a sealing head fitting out this type of installation, this head, also designated as a (test bench/part to be tested)-interface head, being intended to sealably come into contact with the part to be tested, in order to inject it with a gas flow into its flow circuit.

The type of achieved fluid test may be varied, and for example concerns the measurement of a leak rate through the part to be tested, for example the leak rate through to a turbine rectifier hollow vane.

STATE OF THE PRIOR ART

Such a test installation generally comprises a fixed bench and a support on which the part to be tested is mounted, as well as one or more sealing heads, intended to come into contact with the part, respectively facing the apertures of the latter, in order to feed them with a gas flow used for conducting the test.

Customarily, each sealing head is borne by the piston of an actuator, so as to be able to be set into translation and rotation/tilting along the axis of the piston, in the direction of its associated aperture. The alignment between the sealing element of the head and the aperture of the part to be tested normally guarantees a satisfactory seal for the circulation of the gas flow escaping from the head and penetrating into the aperture of the part.

Nevertheless, such an alignment may prove to be difficult to obtain and to preserve, notably because of possible displacement of the part to be tested, so that it is generally provided that an operator checks that the head docks alongside the part, before launching the test operation. This slows down the test method considerably given that such dockings have to be achieved frequently.

Further, the sealed nature of the docking may be difficult to detect visually for an operator. Thus, a minor misalignment between the sealing element and the aperture of the part may escape the visual inspection of the operator, with important consequences on the conducted measurements.

SUMMARY OF THE INVENTION

The object of the invention is therefore to at least partly find a remedy to the aforementioned drawbacks, relating to the embodiments of the prior art.

To do this, the object of the invention is first of all a sealing head for an installation for performing fluid tests on a part of an aircraft turbine engine having a circuit for the flowing of a gas flow, said head comprising a sealing element along a closed line and interiorly crossed by a passage for letting through a gas flow, said sealing element having a sealing surface intended to come into contact with a part to be tested, and an aperture of the latter intended to be supplied with said gas flow.

According to the invention, the sealing head further comprises means for centering the sealing element with respect to said aperture of the part to be tested, said centering means being firmly attached to this element and protruding towards the front of said sealing surface having an outer portion surrounding these centering means.

Thus, the invention cleverly provides attachment of means for centering the sealing element, intended to penetrate into the aperture of the part to be tested in order to provide effective alignment of both of these elements, guaranteeing sealed docking. In other words, the centering means are laid out so that their accommodation within the aperture of the part guarantees satisfactory positioning of the outer portion of the sealing surface around the aperture. The visual inspection of the operator may therefore be simplified, or even suppressed, and the risks of obtaining non-sealed docking are reduced to zero. The fluid tests to be performed may therefore follow on from each other more rapidly, moreover while obtaining very relevant results, because of the absence of any leak at the junction between the aperture of the part and the sealing surface of the head.

Further, the present invention's own specificity provides reproducibility compatible with the requirements associated with the partial or complete automation of the test insulation equipped with such heads. Such automation may therefore be contemplated advantageously.

Preferably, the sealing head also comprises a base with holes as well as connecting means laid out between said base with holes and the sealing element, said head being provided in order to allow circulation of the air flow, from the rear to the front, successively through said base with holes, the connecting means and said passage defined by the sealing element.

In such a scenario, said connecting means are preferentially designed in order to allow displacement of said centering means with respect to said base with holes. These means therefore allow self-centering of the sealing element with respect to its associated aperture provided on the part to be tested. Nevertheless, other configurations may be contemplated for obtaining self-centering of the sealing element, such as the one allowing the displacement of the assembly of the tooling bearing the sealing head, facing the part to be tested.

Preferably, in order to ensure the aforementioned displacement, said connecting means assume for example the shape of a hollow elastic part, for example an axisymmetrical shape, intended to be crossed by the gas flow, and for example adopting the shape of bellows. Such bellows are actually perfectly adapted for accompanying the displacement of the sealing element during its self-centering, while imparting sufficient mechanical rigidity in order to ensure the connection of this element onto the base with holes of the head.

Preferably, said centering means comprise a pin or a plurality of centering pins, for example, two, three or four, depending on the shape of the aperture into which they have to penetrate. Generally, the pins are designed and laid out so as to create as less perturbation as possible on the flow entering the part to be tested.

Preferably, said centering means are mounted removably on said sealing element, in order to facilitate their replacement in the case of wear.

The object of the invention is also tooling for an installation aiming at performing fluid tests on aircraft turbine engine part having a circuit for the flowing of a gas flow, said tooling comprising a sealing head as shown above, as well as a chamber for tranquilization of the gas flow, intended to feed said sealing head with a gas flow, and mounted on the latter.

Preferably, this tooling further comprises an actuator, the piston of which bears said tranquilization chamber.

The object of the invention is also an installation aiming at performing fluid tests on an aircraft turbine engine part having a circuit for the flowing of a gas flow, this installation comprising at least one tooling as described above, and preferably as many toolings as there are apertures to be simultaneously fed with a gas flow.

Finally, the object of the invention is a method for carrying out a fluid test on an aircraft turbine engine part having a circuit for the flowing of a gas flow, by means of a sealing head as the one described above, said method comprising the following steps:

displacement of the sealing head towards the part to be tested, so that its centering means penetrate into the aperture of this part, the displacement being continued until a sealed contact is established between said sealing surface and the part to be tested;

injecting the gas flow into said aperture of a part to be tested, through said sealing head; and taking measurements on the gas flow.

Other advantages and characteristics of the invention will become apparent in the non-limiting detailed description below.

BRIEF DESCRIPTION OF THE DRAWINGS

This description will be made with reference to the appended drawings wherein;

FIG. 2b' illustrates a sectional view taken along the line IIb'-IIb' of FIG. 2b;

DETAILED DESCRIPTION OF PREFERRED EMBODIMENTS

Figure 1:
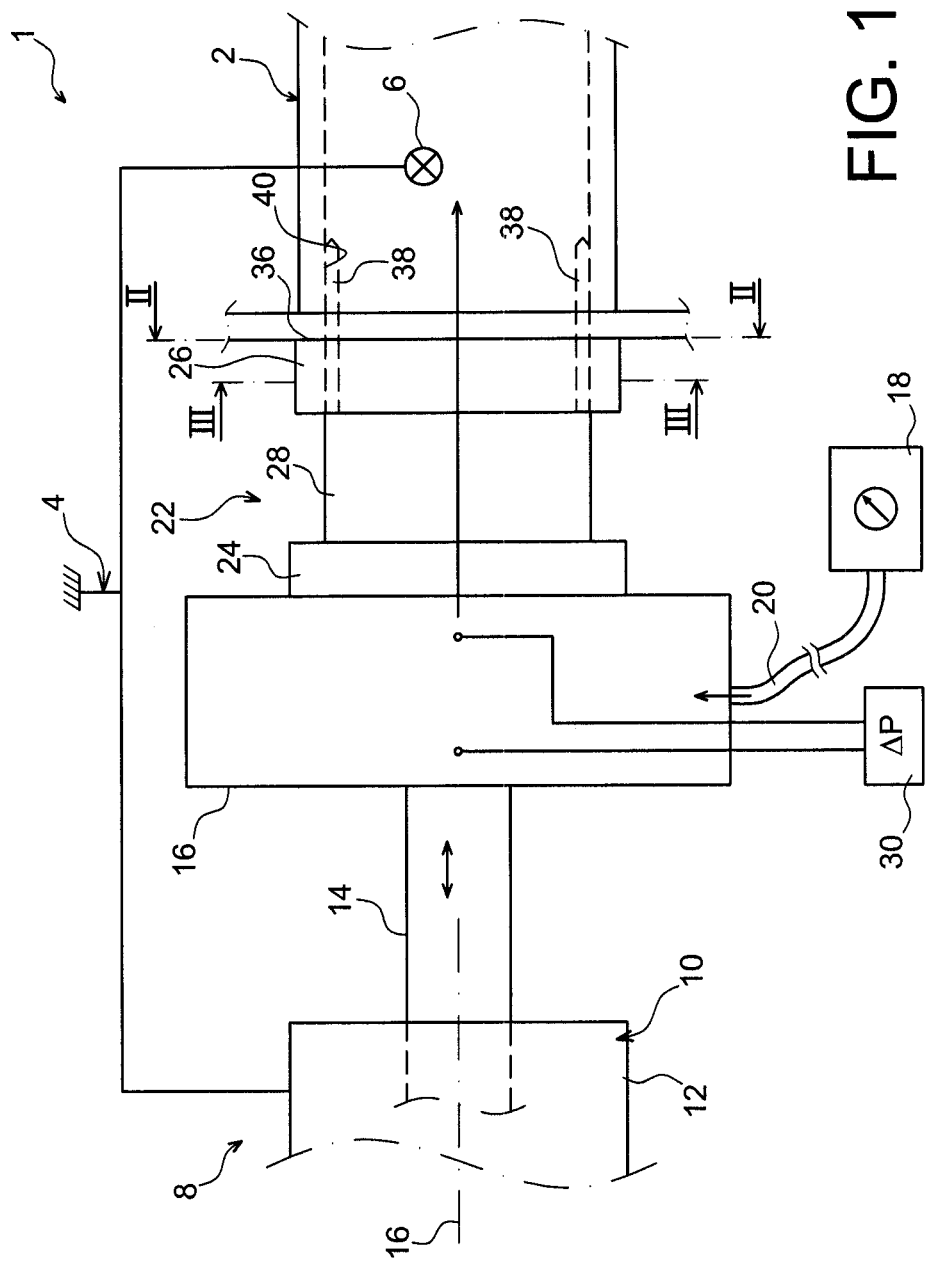
FIG. 1 illustrates a schematic top view of an installation aiming at performing fluid tests on an aircraft turbine engine part, the installation being found in the form of a preferred embodiment of the present invention.

First of all with reference to FIG. 1, an installation 1 may be seen, aiming at performing fluid tests on an aircraft turbine engine part 2 having a circuit for the flowing of a gas flow, the installation appearing in the form of a preferred embodiment of the present invention.

Here, the part to be tested 2 is for example a hollow rectifier vane intended to be crossed when it operates, by an air flow penetrating through one of its radial ends, and escaping through orifices (not shown) positioned on its trailing edge, all along the latter. Thus, the installation 1 is provided for determining the leak flow rate through the rectifier vane 2, this leak flow rate should actually be tested, for example after having repaired the vane.

The installation 1 comprises a fixed bench 4, which has only been illustrated schematically, and on which the part 2 is fixedly mounted, removably, via conventional attachment means known to one skilled in the art, referenced as 6 on FIG. 1. On this bench is also mounted tooling 8, the main function of which is to feed the part to be tested 2, laid out on the bench, with a gas flow. Therefore, it is clear that if only one tool 8 has been illustrated in FIG. 1, the installation may provide several of them, connected to each other or independent of each other, each intended to co-operate with a specific aperture of the part 2 through which a gas flow has to be injected. As an example, two toolings 8 may be provided on either side of the vane 2, so as to simultaneously inject a gas flow through both of these opposite radial apertures.

The tooling 8 comprises an actuator 10, the body 12 of which is attached to the bench 4, and the piston 14 of which is translationally displaceable facing its body 12 along the direction of its axis 16. The end of the piston 14 bears a tranquilization chamber 16 into which a gas flow may be introduced, through ancillary feeding means 18, connected to this chamber via a flexible hose 20. As an indicative example, the feeding means 18 may assume the form of a gas source laid beside the bench 4.

Further, the tooling 8 comprises a sealing head 22, fixedly borne by the tranquilization chamber 16 with which it communicates. To do this, the sealing head 22, comprises a base with holes 24 used for the mechanical connection onto the tranquilization chamber 16, a sealing element/gasket 26, as well as connecting means 28 laid out between the base 24 and the sealing element 26 bearing against the part to be tested 2.

With such a configuration, the gas flow circulates from the front towards the rear, successively through the tranquilization chamber 16, the base with holes 24, the connecting means 28, the sealed gasket 26, in order to finally penetrate into the part to be tested. Here, obtaining the sought leak flow rate for example consists of determining the pressure difference between two points of the chamber 16 spaced apart from each other in the direction of circulation of the gas flow, and this by means of a suitable measuring apparatus 30.

Figure 2:
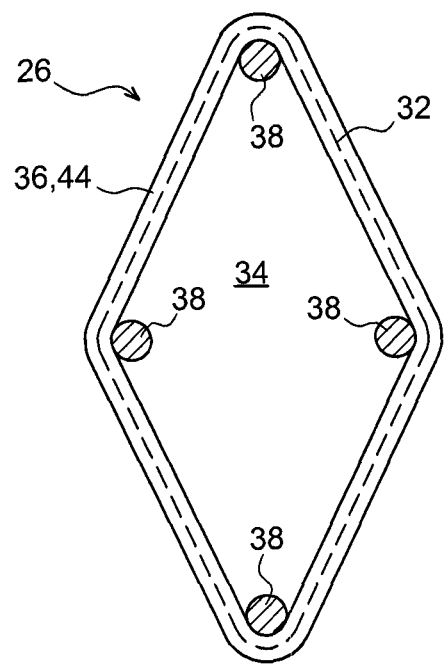
FIG. 2 illustrates a sectional view taken along the line II-II of FIG. 1, showing the sealing head fitting out the installation.
Figure 3:
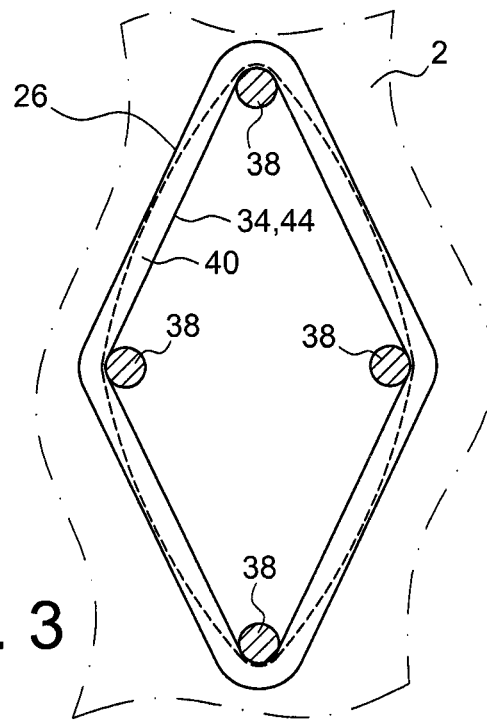
FIG. 3 illustrates a sectional view taken along the line of FIG. 1.

With reference to FIGS. 1, 2 and 3, it may be seen that the seal gasket 26 follows a closed line 32 schematically illustrated in dotted lines in FIG. 2, this gasket interiorly defining a passage 34 for the gas flow flowing towards the part to be tested.

One of the particularities of the present invention lies in the fact that the sealing head 26 further comprises means for centering the seal gasket relatively to the part to be tested, these centering means being firmly attached to the sealing element 26 and protruding from a sealing surface 36 defined by the gasket and intended to be in contact with the part 2 to be tested. Here, the centering means assume the shape of a plurality of centering pins 38 protruding forwards and each having an end with the shape of a tip or with a convex or conical nose shape, in order to facilitate its introduction into the aperture 40 of the part to be tested. Indeed, as this is better visible in FIG. 1, the centering pins 38 are intended to penetrate into the aperture 40 defined by the part 2 and through which the gas flow is intended to circulate, by following the interior wall of this aperture 40.

Figure 2A:
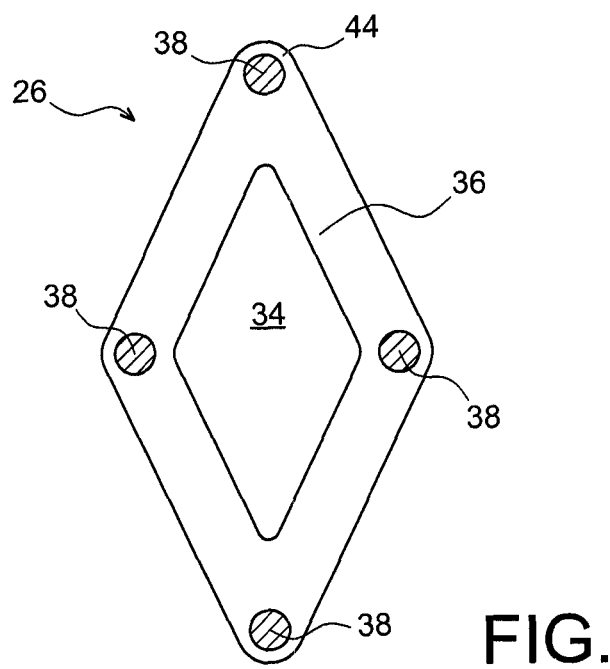
FIG. 2a illustrates a similar view to the one shown in FIG. 2, with the sealing head appearing in the form of a first alternative embodiment.

Further, the sealing surface 36 is formed so that an outer portion of the latter surrounds the centering means 38, so that this outer portion 44 is found bearing upon the part 2 all around the aperture 40, as this was schematized in FIG. 3. With this it is possible to give a perfect seal at the junction between the sealing head 22 and the part to be tested 2. In this preferred embodiment, the outer portion 44 surrounding the protruding pins 38 corresponds to the entirety of the sealing surface 36. Nevertheless, an alternative embodiment shown in FIG. 2a shows a different configuration, in which the centering pins 38 stem from the sealing surface 36, implying that a portion of the latter is interiorly located relatively to these pins 38. Moreover, the latter are not again found located in the passage 34 but exteriorly with respect to the latter, defined by the sealing surface 36.

Figure 2B:
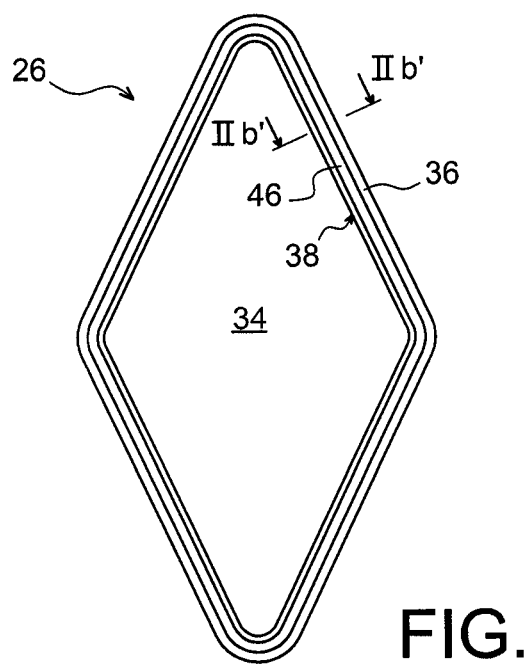
FIG. 2b illustrates a view similar to the one shown in FIG. 2, with the sealing head appearing in the form of a second alternative embodiment.
Figure 2B:
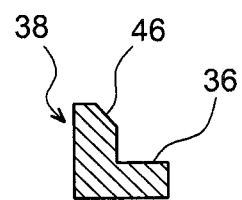

According to still another alternative embodiment, the centering means of the sealing element 26 no longer assume the shape of a plurality of pins spaced apart from each other, but of a protruding lip also referenced as 38 in FIGS. 2b and 2b', this lip 38 extending continuously all around the aperture 34. In order to facilitate the introduction of this lip 38 into the corresponding aperture 40 of the part 2, the latter has a chamfered end 46.

Figure 4A:
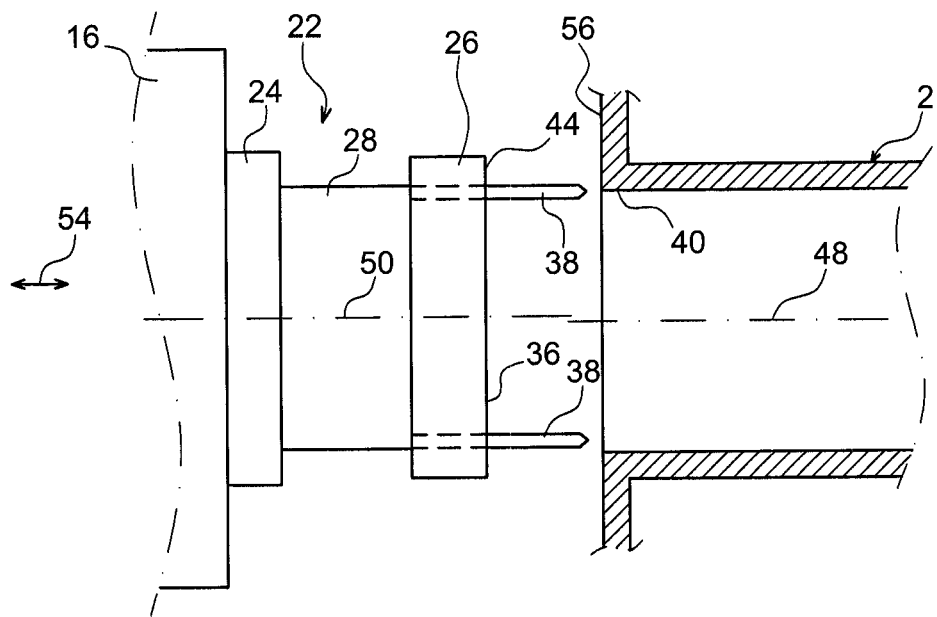
FIGS. 4a and 4b schematize the displacement of the sealing head towards the part to be tested, causing self-centering of its sealing element.
Figure 4B:
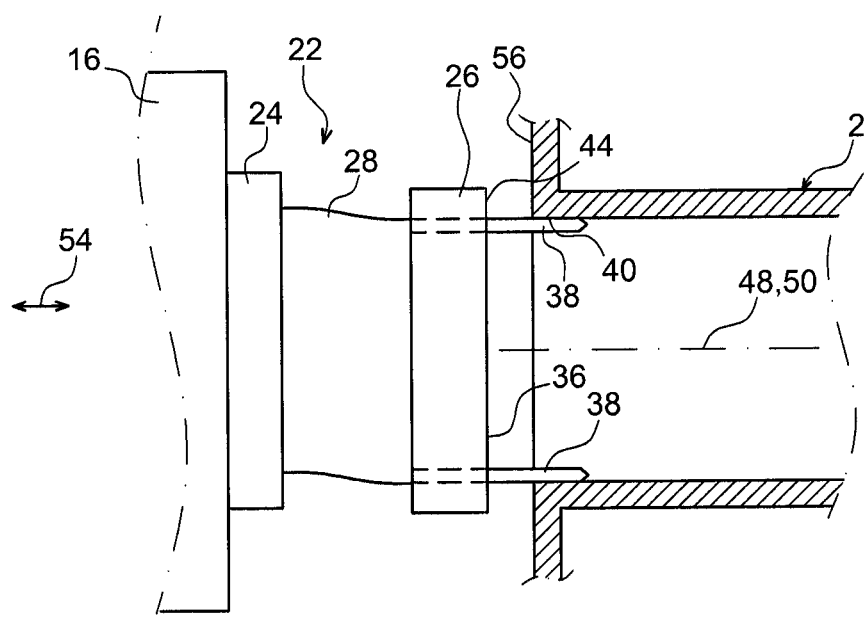

With reference now to FIGS. 4a and 4b, the displacement of the sealing head 22 towards the part 2 is shown, while a slight misalignment is encountered between both of these elements 2, 22. In other words, the central axis 48 of the aperture 40 does not coincide with the central axis 50 of the sealing gasket 26, a shift by 1 mm for example being observed. As such, it is noted that, with the tooling here, it is possible to compensate the misalignments of the order of a few millimeters, for example 5 mm, even if the customarily encountered misalignments are of the order of 1 mm.

When the sealing head 22 is displaced under the effect of the movement of the piston of the tooling, along the direction 54 parallel to the axis 48 and 50, at least one of the centering pins 38 will have its tapered end come into contact with the interior wall of the aperture 40. As the advance of the head 22 is continued gradually, the pressing action of the interior wall of the aperture 40 upon the aforementioned pin 38 is expressed by a displacement of the whole of the pins 38, leading to a same displacement of the sealed gasket 26 firmly attached to these pins. The gasket 26 therefore sees its axis 50 gradually move closer to the axis 48 of the aperture 40, until it coincides with the latter, as shown in FIG. 4b.

As this will be explained hereafter, the thereby caused self-centering of the sealing element 26 is allowed by the connecting means 28 which give the possibility of absorbing the relative displacement between the gasket 26 and the base with holes 24 remaining in its initial position.

The displacement of the sealing head 22 with its self-centered sealed gasket 26 relatively to the aperture 40 is continued until the sealed contact is obtained between the outer portion 44 of the sealing surface 26 and the surface 56 of the part 2 delimiting the aperture 40. It is only once this sealed junction is established that the gas flow may be injected into the tranquilization chamber of the installation, this operation being followed by measurement operations required on this same flow.

Figure 5:
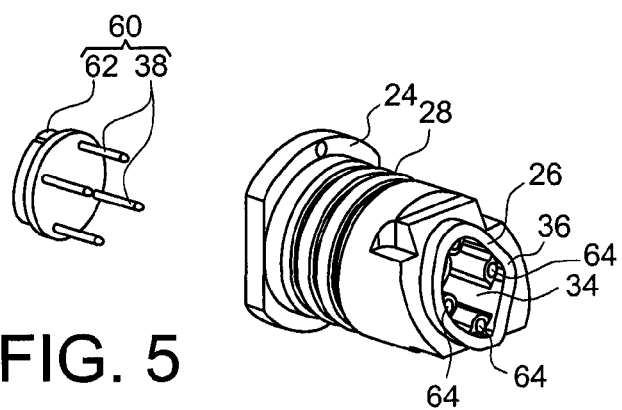
FIG. 5 shows a perspective view of the sealing head illustrated in more detail.

FIG. 5 shows a possible embodiment for the sealing head 22, one of the particularities of which lies in the fact that the centering pins 38 are removably mounted on the sealed gasket 26. Indeed, a consumable part 60 is provided with a base 62 from which protrude the pins 38, this consumable part 60 being intended to be introduced into the hollow head 22 so as to have each of the pins 38 penetrate into their associated sheaths 64, provided within the passage 34 defined by the sealed gasket 26.

Figure 6A:
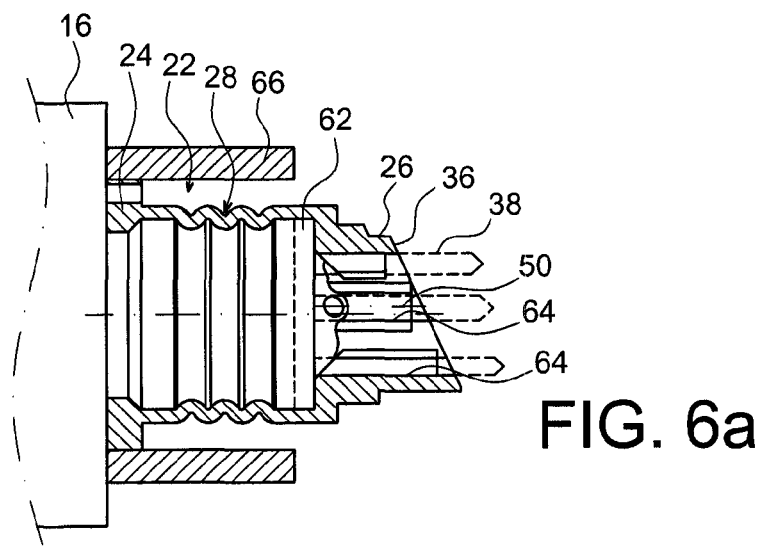
FIG. 6a illustrates a longitudinal sectional view of the head shown in FIG. 5, with the head occupying a rest position.
Figure 6B:
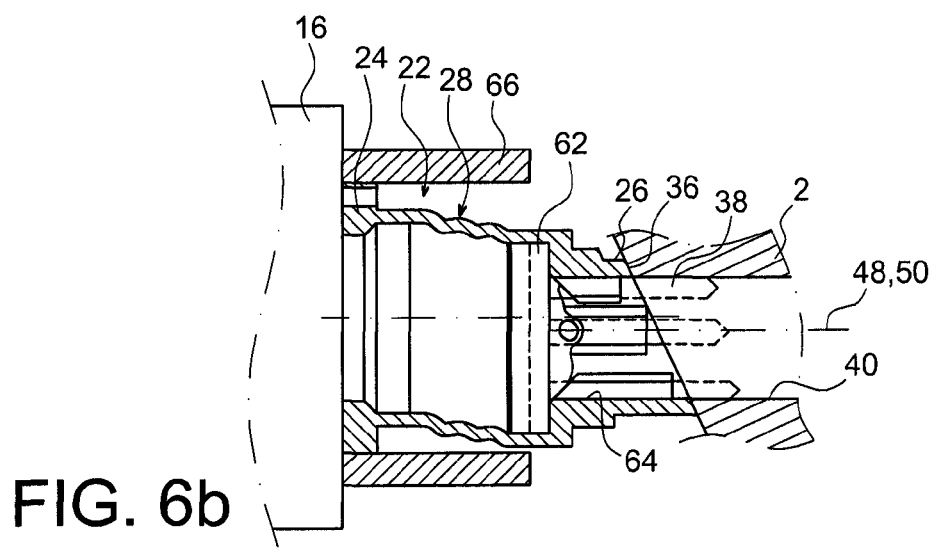
FIG. 6b illustrates a view similar to the one shown in FIG. 6a, after the sealing element has self-centered.

FIG. 6a shows this sealing head 22 at rest, mounted on the tranquilization chamber 16 via its base 24 and accommodated in a fixedly added guide 66 on the same tranquilization chamber. Here, the connecting means 28 assume the shape of a hollow elastic part with an axisymmetrical shape, and adopting the shape of bellows which proves to be particularly satisfactory for accompanying the sought relative displacement between the base 24 and the seal gasket 26, during the self-centering of the latter. In this respect, FIG. 6b shows the sealing head 22 with its gasket 26 in a self-centered configuration relatively to the aperture 40 of the part 2 into which the centering means 38 have been introduced, the displacement between the seal gasket 26 and the base 24 now being allowed here by the elastic deformation of the bellows 28. Naturally, during the withdrawal of the sealing head 26, an inverse displacement is observed, leading the gasket 26 to again finding its rest position as shown in FIG. 6a.

Figure 7A:
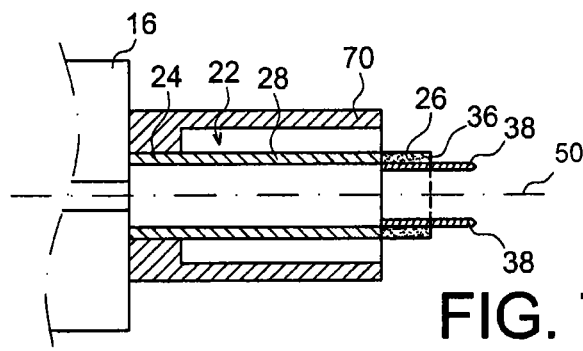
FIG. 7a illustrates a sectional view of the sealing head appearing in the form of an alternative embodiment, and occupying a rest position.
Figure 7B:
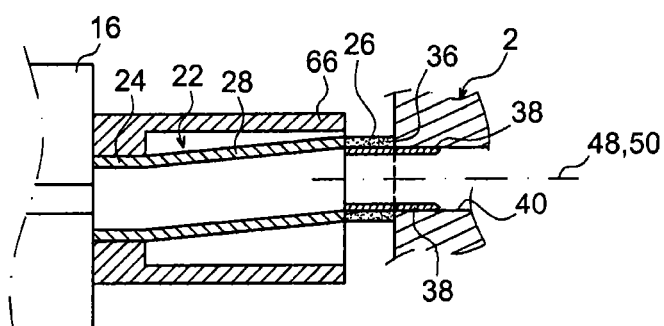
FIG. 7b illustrates a view similar to the one shown in FIG. 7a, after the sealing element has self-centered.

FIGS. 7a and 7b show an alternative embodiment for the head 22, in which the main modification lies in the design of the contacting means 28. Here they assume the shape of an elastic hollow cylinder therefore having sufficient flexibility for allowing self-centering of the sealing element 26 in the aperture 40 of the part 2, as this was illustrated in FIG. 7b. Indeed, the flexibility of the cylinder 28, preferably with a circular section, allows displacement of this gasket 26 relatively to the base 24 which remains fixed.

Figure 8A:
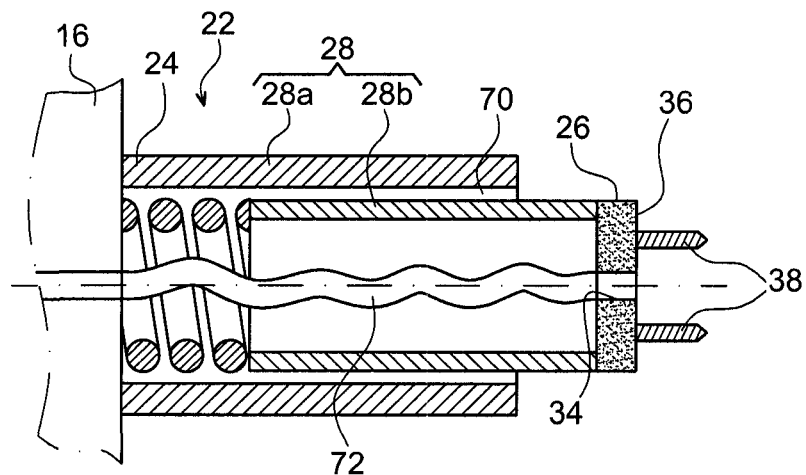
FIG. 8a illustrates a sectional view of the sealing head appearing in the form of another alternative embodiment, and occupying a rest position.
Figure 8B:
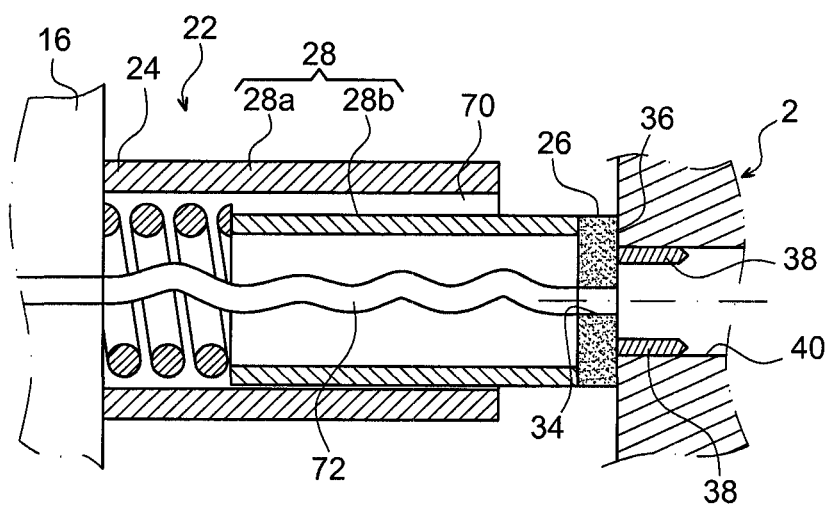
FIG. 8b illustrates a view similar to the one shown in FIG. 8a, after the sealing element has self-centered.

Finally, FIGS. 8a and 8b show another alternative embodiment for the sealing head 22, in which the main changes also lie in the design of the connecting means 28. They comprise here two substantially rigid concentric cylinders 28, 28b, the outer cylinder 28a integrating the base with holes 24 firmly attached to the tranquilization chamber 16. Further, the interior cylinder 28b at its front end bears the seal gasket 26, a spring may optionally be interposed between its rear end and the tranquilization chamber 16. Here, radial play 70 is expressly provided between both cylinders 28a, 28b, so as to be able to obtain the radial displacement between the seal gasket 26 and the base 24 of the head 22. Indeed, as this is shown in FIG. 8b, the self-centering of the sealing element 26 in the aperture 40 of the part 2, may be performed by consuming the play 70 provided for this purpose. In order to preserve the seal within the head 22, provision may be made for connecting the passage 34 defined through the seal gasket 26 to the tranquilization chamber 16 through a preferably flexible conduit 72 making its way through the hollow space defined by the interior cylinder 28b and the base 24.

In the whole foregoing description, a situation was described in which the misalignment is expressed by a shift between the central axis 50 of the seal gasket 26, and the central axis 48 of the aperture 40 intended to cooperate with the tooling bearing the relevant head 22, both of these axis 48, 50 being shifted but nevertheless remaining parallel. Thus, the sought displacement in order to result in the self-centering of the seal gasket corresponds to a radial displacement aiming at causing both of the aforementioned axis to coincide.

Nevertheless, the invention is not limited to this type of alignment correction and is also suitable for dealing with other misalignments, like the one resulting for example from a slight tilt of one of the two axes relatively to the other, the observed displacement during self-centering of the seal gasket 26, in this case, corresponding to a gradual correction of this tilt, always so as to cause both axes 48, 50 to coincide. Nevertheless, in this scenario, reference is always made to a "radial displacement" of the gasket 26 with respect to the base with holes 24 of the sealing head 22.

As mentioned above, the sealing head 22 is designed so as to be able to allow displacement of the seal gasket 26 relatively to the base 24, as seen from the front, of the order of a few millimeters from the rest position.

Of course, various modifications may be made by one skilled in the art to the invention which has just been described, only as non-limiting examples.

The invention claimed is:

1. A sealing head for an installation configured to perform fluid tests on an aircraft turbine engine part including a circuit for flowing of a gas flow, the sealing head comprising:
    a sealing element following a closed line and interiorly crossed by a passage for letting through a gas flow, the sealing element including a sealing surface configured to come into contact with a part to be tested, at an aperture of the part to be tested configured to be fed with the gas flow;
    means for centering the sealing element with respect to the aperture of the part to be tested, the centering means being firmly attached to the sealing element and protruding towards a front of a sealing surface having an outer portion surrounding the centering means, and
    a base including holes and connecting means laid out between the base with holes and the sealing element, the head configured to allow circulation of the air flow, from the rear to the front, successively through the base with holes, the connecting means and the passage defined by the sealing element,
    wherein the connecting means is configured to allow a displacement of the centering means with respect to the perforated base.

2. The sealing head according to claim 1, wherein the centering means comprises a centering pin or a plurality of centering pins.

3. The sealing head according to claim 1, further comprising the centering means is removably mounted on the sealing element.

4. A method for performing a fluid test on an aircraft turbine engine part having a circuit for the flowing of a gas flow, by a sealing head according to claim 1, the method comprising:
    displacing the sealing head towards the part to be tested, so that its centering means penetrates into the aperture of the part, the displacing being continued until a sealed contact is established between the sealing surface and the part to be tested;
    injecting the gas flow into the aperture of a part to be tested, through the sealing head; and
    taking measurements on the gas flow.

5. The sealing head according to claim 1, wherein said means for centering the sealing element with respect to the aperture of the part to be tested comprise at least one protrusion protruding from the sealing element and configured to fit into said part to be tested.

6. The sealing head according to claim 1, wherein the connecting means assumes a shape of a hollow elastic part, configured to be crossed by the gas flow.

7. The sealing head according to claim 6, wherein the hollow elastic part assumes a shape of bellows.

8. A tooling for an installation configured to perform fluid tests on an aircraft turbine engine part including a circuit for flowing of a gas flow, the tooling comprising:
    a sealing head according to claim 1; and
    a chamber for tranquilization of the gas flow, configured to feed the sealing head with a gas flow, and mounted on the sealing head.

9. The tooling according to claim 8, further comprising an actuator, a piston of which bears the tranquilization chamber.

10. An installation configured to perform fluid tests on an aircraft turbine engine part including a circuit for the flowing of a gas flow, comprising at least one tooling according to claim 8.

* * * * *